Dec. 29, 1959 W. H. ZINN 2,919,236
NUCLEAR REACTOR INCLUDING A PACKAGE SAFETY DEVICE
Filed Feb. 6, 1957 4 Sheets-Sheet 1

INVENTOR.
Walter H. Zinn
BY
Roland A. Anderson
Attorney

Dec. 29, 1959 W. H. ZINN 2,919,236
NUCLEAR REACTOR INCLUDING A PACKAGE SAFETY DEVICE
Filed Feb. 6, 1957 4 Sheets-Sheet 2

INVENTOR.
Walter H. Zinn
BY
Roland A. Anderson
Attorney

Dec. 29, 1959  W. H. ZINN  2,919,236
NUCLEAR REACTOR INCLUDING A PACKAGE SAFETY DEVICE
Filed Feb. 6, 1957  4 Sheets-Sheet 3

INVENTOR.
Walter H. Zinn
BY
Roland A. Anderson
Attorney

Dec. 29, 1959  W. H. ZINN  2,919,236
NUCLEAR REACTOR INCLUDING A PACKAGE SAFETY DEVICE
Filed Feb. 6, 1957  4 Sheets-Sheet 4

INVENTOR.
Walter H. Zinn
BY
Attorney

United States Patent Office 2,919,236
Patented Dec. 29, 1959

2,919,236

NUCLEAR REACTOR INCLUDING A PACKAGE SAFETY DEVICE

Walter H. Zinn, Clearwater, Fla., assignor to the United States of America as represented by the United States Atomic Energy Commission Application February 6, 1957, Serial No. 638,666

2 Claims. (Cl. 204—193.2)

The present invention relates to a safety device for use in a nuclear reactor.

It is well known that safety of operation of nuclear reactors is of the utmost concern today. The major hazard affecting reactor safety is the possibility that the nuclear reaction will get out of control, that the power will rise to a very high level in an extremely short time, and that parts of the reactor will melt or even vaporize with consequent contamination of the surroundings of the reactor. Even though the reactor be so located and constructed that an accident will not cause injury to personnel, it is imperative that the reactor be so provided with safety devices that the occurrence of accidents be reduced to very near the vanishing point. This is particularly true of power reactors which form power plants which are in economic competition with other forms of power plant. The frequency with which accidents occur may be largely determinative of the practicability of such competition due to the very high cost of repair of a reactor in the event of a major accident.

In view of these considerations "fail-safe" safety devices are incorporated into all reactors. These safety devices normally comprise a rod formed of a material having a high absorption cross section for neutrons which is rapidly inserted into the core of the reactor upon the occurrence of designated events such as the failure of an electric circuit, an interruption in the flow of coolant, or an increase in the power level above that at which the reactor is designed to operate.

In addition to "fail-safe" safety devices, reactors normally are provided with auxiliary or backup safety devices which may act with the normal safety rods in the event of a power excursion but more likely would operate only in case of failure of the normal safety rods. Such devices may, for example, dump the moderator or fuel solution, remove the reflector from the locality of the core, or introduce a material having a high absorption cross section for neutrons into the core of the reactor.

The safety device to which the present invention is directed does not replace the "fail-safe" safety rods described but rather supplements such safety rods as an auxiliary safety device.

Auxiliary safety devices for use in nuclear reactors must be inherently reliable, that is, they must act properly in emergencies and at the same time remain quiescent if no emergency exists. It is desirable that such a reactor safety device should be earthquake and bombproof, sabotageproof, directly triggered by an increase in neutron flux above a prescribed level, require a minimum of mechanical or electrical circuitry, and must not permanently damage the reactor or require long shutdown times after operation thereof. In addition, it is desirable that such an auxiliary safety device be applicable to all or virtually all existing reactors as well as reactors to be constructed.

It is accordingly an object of the present invention to provide a safety device fo ra nuclear reactor which is inherently reliable and may be employed in any nuclear reactor with a minimum of difficulty.

It is a further object of the present invention to provide a safety device for a nuclear reactor which automatically permits a material of high neutron absorption cross section to shift in an emergency from a position where it has little effect on the reactivity of the reactor to a position where it has a much greater effect on the reactivity of the reactor; that is, to shift from a position of low statistical weight within the reactor to a position of high statistical weight.

These and other objects of the present invention are satisfied by a safety device in which a gas having a high neutron absorption cross section is held under pressure in a position of low statistical weight in the reactor by a fuse which blows out when the neutron flux within the reactor increases a predetermined amount above that normally present therein thereby permitting the gas to expand into a position of high statistical weight within the reactor.

Other objects and advantages of the present invention will be readily understood by the man skilled in the art from a further reading of the specification, particularly when viewed in the light of the drawings in which Fig. 1 is a vertical sectional view of a neutronic reactor which includes a safety device according to the present invention;

Figure 1:
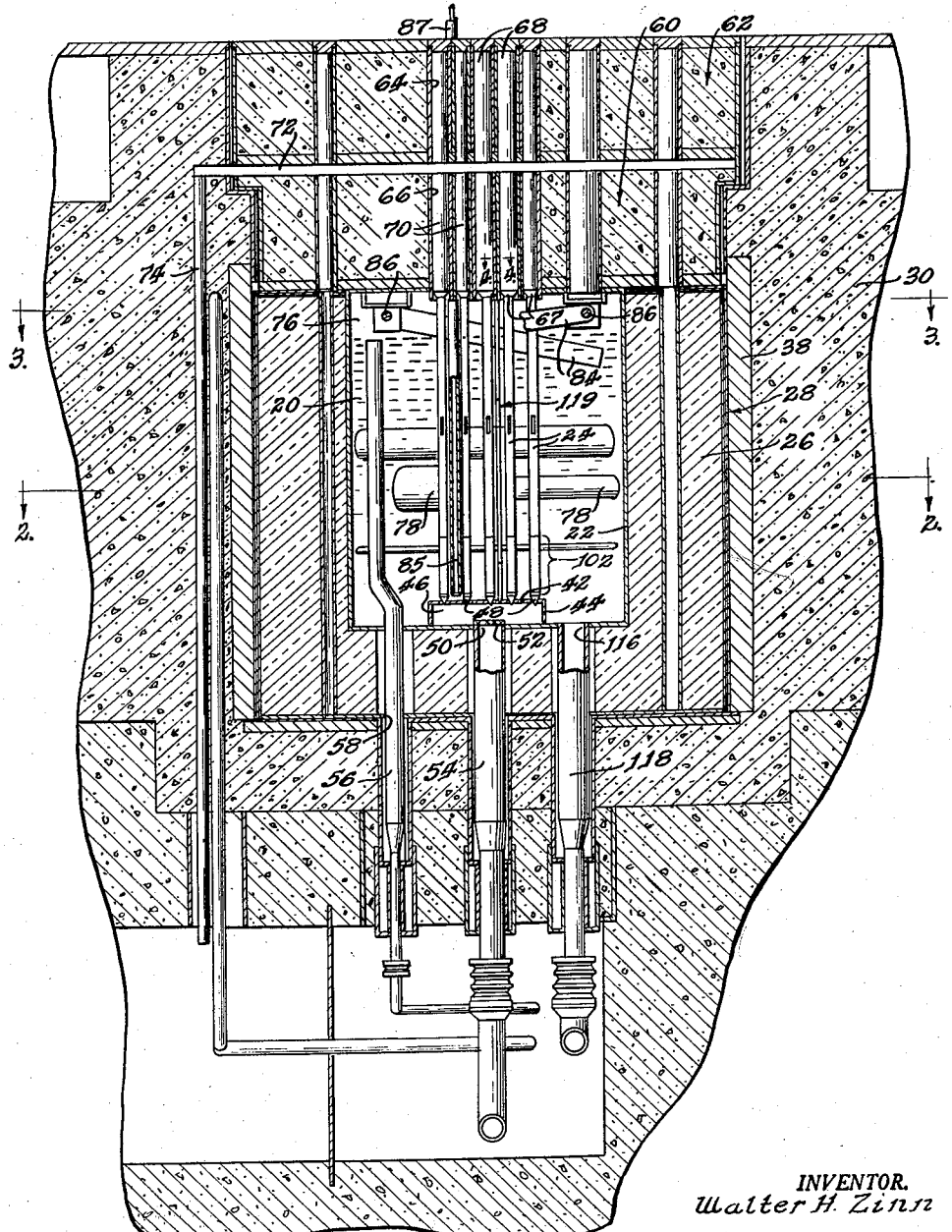
Figure 2:
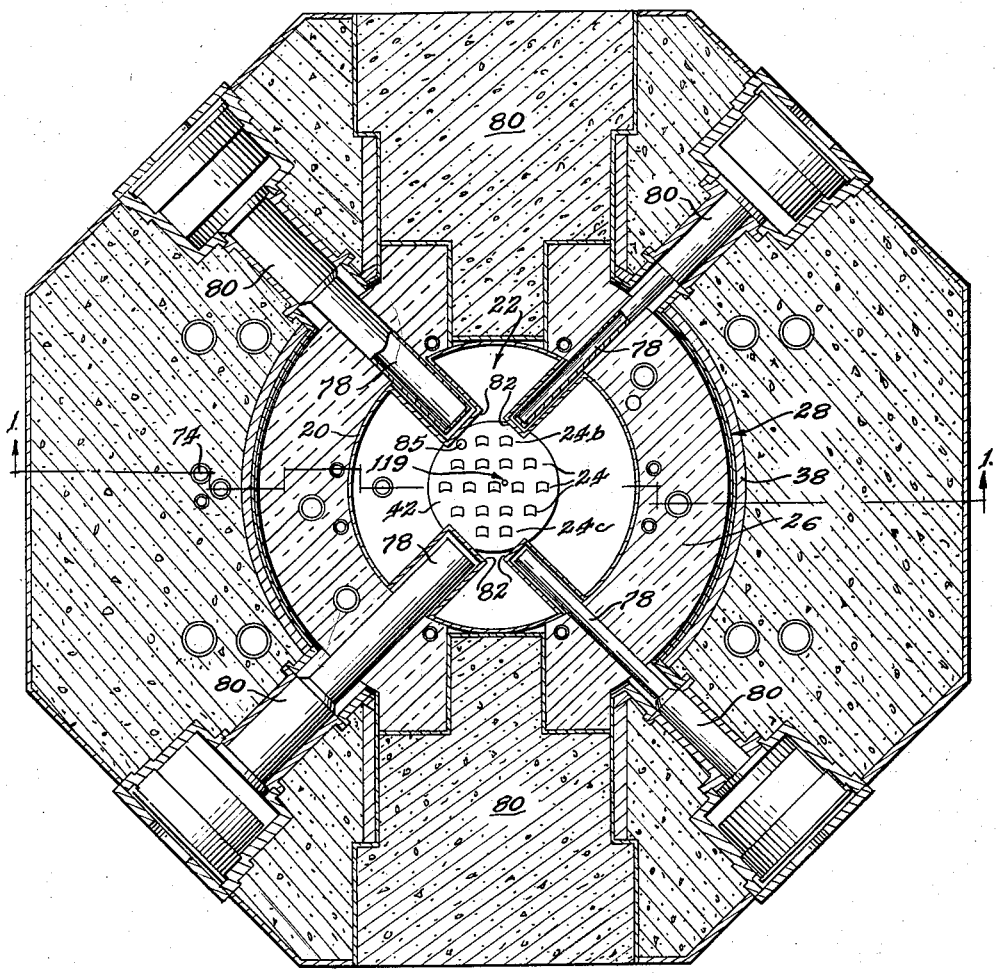
Fig. 2 is a horizontal sectional view taken along line line 2—2 of Fig. 1.
Figure 3:
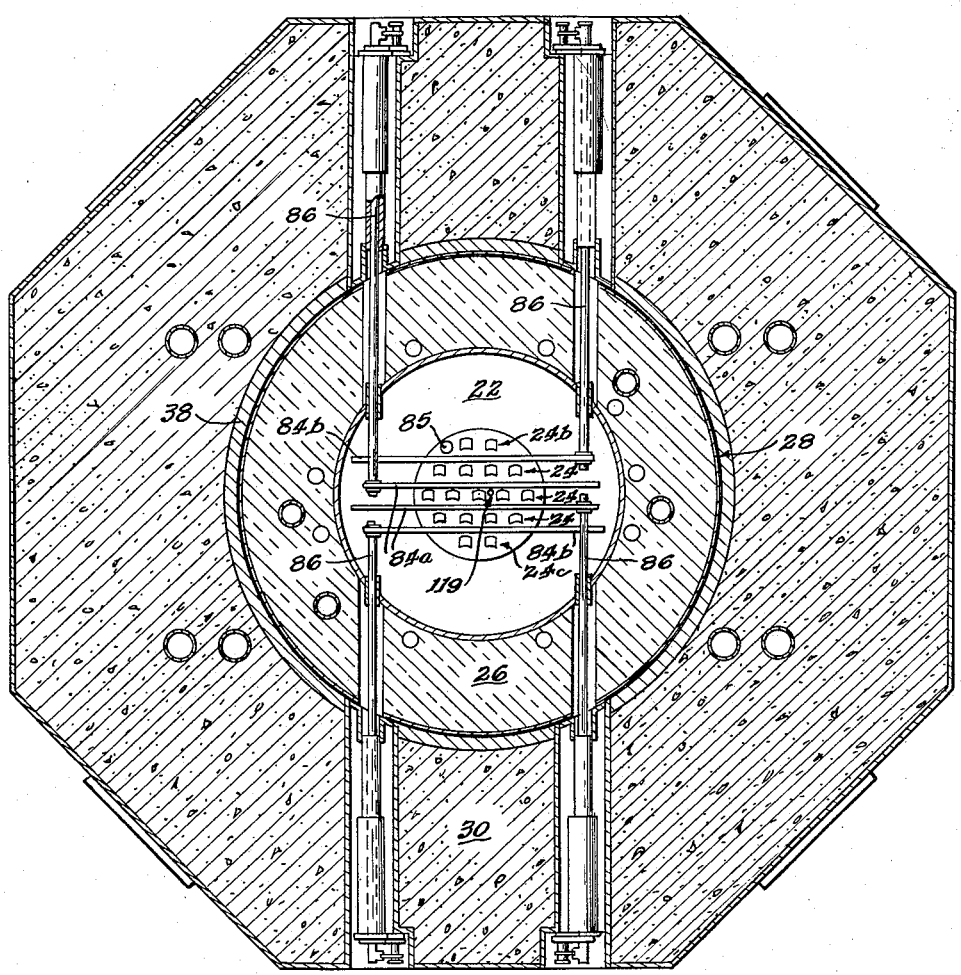
Fig. 3 is a horizontal sectional view taken along line 3—3 of Fig. 1.

The reactor shown in Figs. 1 through 3 utilizes a heavy water moderator, heavy water coolant, and $U^{235}$ fuel. The heavy water moderator is contained within a tank 22, and has been designated by the reference numeral 20. Fuel elements 24 are vertically mounted within the tank 22 and contain $U^{235}$ fuel for the neutronic chain reaction. The region 26 surounding the sides and bottom of the tank contains solid neutron reflecting material, this material being graphite in the form of blocks in the reactor construction which will be detailed in the present specification. A thermal shield 28 surrounds the region 26, and a concrete shield 30 surrounds the thermal shield 28.

In the construction of the reactor described throughout the present specification, the tank 22 is constructed of aluminum and has an inner diameter of 72 inches and a wall thickness of 1.27 centimeters. The total height of the tank 22 is 86 inches, the heavy water 20 extending to a height of 78 inches. The region 26 containing graphite is in the form of a hollow cylinder and contacts the outer surface of the aluminum tank 22, and has a thickness of 24 inches. A layer of lead bricks 38 surrounds the thermal shield 28.

A plurality of channels (not shown) extend through the thermal shield 28 and a water coolant flows through these channels to cool the thermal shield 28.

A mounting plate 42 is supported above the bottom of the tank 22 by an annular support member 44 which is sealed to both the tank 22 and the mounting plate 42. In this manner, a plenum chamber 46 is formed, the only access to the interior of the tank 22 being through apertures 48 in the mounting plate 42 which are provided to accommodate the fuel elements 24, the fuel elements 24 forming a seal within the apertures 48. The tank 22 is provided with an orifice 50 which opens into the plenum chamber 46, and a strainer 52 is disposed between the orifice 50 and the plenum chamber 46. A coolant inlet pipe 54 extends through the shield 30, thermal shield 28, and region 26 of graphite and is sealed within the orifice 50 in the tank 22. A flow of $D_2O$ for cooling the fuel elements 24 and filling the tank 22 enters the tank through the pipe 54 and orifice 50. An overflow pipe 56 is disposed within the tank 22, the mouth of the overflow pipe 56 being 78 inches above the bottom of the tank in the particular construction of the reactor described in this specification. The overflow pipe 56 extends through an aperture 58 in the base of the tank 22 and is sealed to the tank 22.

There are two shield assemblies 60 and 62 directly above the tank 22. The lower shield assembly 60 is immediately adjacent to the tank 22 and upper shield assembly 62 is above and adjacent to the lower shield assembly 60. Both the upper shield assembly 62 and the lower shield assembly 60 are provided with channels 64 and 66, respectively, which are directly above the apertures 48 in the mounting plate 42. Plugs 68 and 70 are disposed within the channels 64 and 66 and contain neutron and radiation absorbing materials. The plugs 68 and 70 may be removed from the channels 64 and 66 when the reactor is not operating in order to insert fuel elements 24 into the tank 22 of the reactor, the fuel elements 24 being maintained in parallel alignment by the apertures 48 in the plate 42 and retaining rings 67 disposed at the mouth of the channels 66.

In the particular construction of the reactor described throughout the present specification, the lower shield assembly 60 has a thickness of 2 feet 5⅝ inches and the upper shield assembly 62 has a thickness of 2 feet 7¼ inches. A cavity 72 of 2 9/16 inches is disposed between the upper shield assembly 62 and the lower shield assembly 60 and is connected to a source of helium through a helium line 74. The helium also fills the gap 76 between the surface of the heavy water moderator 20 and the lower shield assembly 60.

The reactor is also provided with access ports 78 which extend into the tank 22 and provide regions for the irradiation of materials. The access ports 78 are provided with shield plugs 80 which prevent the escape of radiation. The access ports 78 are provided with neutron and radiation permeable windows 82 which prevent the heavy water moderator 20 from entering the ports 78 but permit neutron beams to be ejected therethrough.

The reactor is provided with control arms 84 and a regulating control rod 85 which are constructed of neutron absorbing materials, such as cadmium or boron. The arms 84 pivot about a shaft 86 disposed adjacent to one end of each arm. The shafts 86 extend through the region 26, thermal shield 28, and shield 30 of the reactor to permit the operator to pivot the arms 84 within the reaction tank 22.

The reactor described has four control arms 84 in all. These arms contain boron sandwiched between aluminum plates, and are 2.5 centimeters thick by 14 centimeters wide and have a total length of approximately 150 centimeters. The arms 84 are disposed to pivot into the moderator 20 of the reactor between the fuel elements 24, two of these arms 84a being used as safety control elements. The safety control elements 84a are maintained in a withdrawn position adjacent to the surface of the moderator 20 at all times, except when it is desired to stop the neutronic chain reaction. The other arms 84b which may be disposed below the surface of the moderator 20 during normal reactor operation are used as "shim" elements. The shim elements are used to effect stepwise changes in reactivity of the reactor, these changes being necessary either to increase or decrease the power level of the reactor or to compensate for long term reactivity changes.

The control rod 85 is disposed exterior to the fuel portion of the reactor and is used as a "regulating" control element. It is this rod 85 which is used to compensate for small changes in reactivity and changes of relatively short time duration. It may be connected to an automatic control means, such as that disclosed in the patent application of Bernard C. Cerutti and Harold V. Lichtenberger, Serial No. 238,479, filed July 25, 1951, now Patent No. 2,682,785.

The control rod 85 in this construction is translatable within a thimble 87 constructed of aluminum which serves to keep the reactor atmosphere from seeping from the tank 22. The rod 85 is approximately 1½ inches in diameter and 2 feet long, and it is constructed of a tube of cadmium and liners of aluminum, thus forming a hollow rod as shown in detail in patent application Serial No. 450,282, filed August 16, 1954, in the name of John M. West and Jordan T. Weills.

The fuel elements 24 for the reactor are shown in detail in the aforementioned application of John M. West and Jordan T. Weills, and the specifications for the fuel elements 24 and the fuel plates contained therein are those given in the said application. As shown in that application, the fuel plates are located in a fuel region 102 of the fuel elements 24. This fuel region extends from a point 16 3/16 inches above mounting plate 42 to a point 42 13/16 inches thereabove.

The fuel elements 24 are placed in a triangular lattice and spaced by six inches between centers, with the exception that the two outer fuel elements are aligned with the adjacent assemblies and spaced six inches therefrom as illustrated in Figs. 2 and 3.

The reactor is cooled by a flow of $D_2O$ which enters the plenum chamber 46 through the pipe 54. It then flows upwardly through the fuel elements 24 and out into the tank 22. The $D_2O$ flows out of the tank 22 through an orifice 116 at the bottom thereof and a pipe 118. The $D_2O$ is cooled by heat exchange with a flow of water which may be refrigerated as described in the aforementioned application. If the level of the $D_2O$ in the reaction tank 22 rises too high, the overflow pipe 56 conducts a portion of the $D_2O$ from the reaction tank to storage from which it may be returned to the cooling cycle.

Operational details of the cooling system are also shown in the aforementioned application of John M. West and Jordan T. Weills.

The reactor above described also includes a backup safety device 119 forming the subject matter of the present invention.

In general the safety device 119 comprises an elongated tube separated into two sections by a barrier which destroys itself when conditions become dangerous in the reactor. In the section of the tube away from the center of the reactor, a gas having a high absorption cross section for neutrons is held under high pressure. When the barrier is destroyed, the gas expands into the remainder of the tube which is located at or near the center of the reactor. In the first location the gas has little effect on the reactivity of the reactor, whereas in the center of the reactor the gas has considerable effect on the reactivity of the reactor. The barrier forms, in effect, a fuse which may be made so as to blow out by the occurrence of any desired conditions within the reactor. Any number of these safety devices may be employed within any reactor. The choice of the number of safety devices will obviously be dictated by the effect obtained from each device and the total effect desired.

Figure 4:
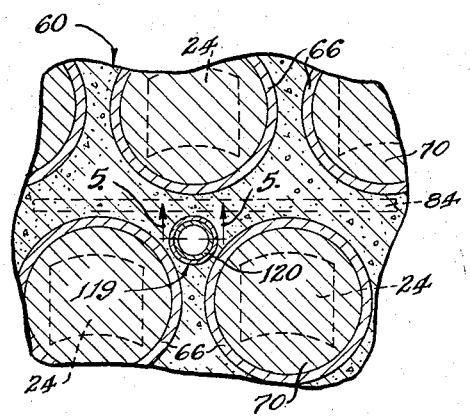
Fig. 4 is a partial horizontal sectional view taken along line 4—4 in Fig. 1 illustrating the location of the safety device within the reactor.
Figure 5:
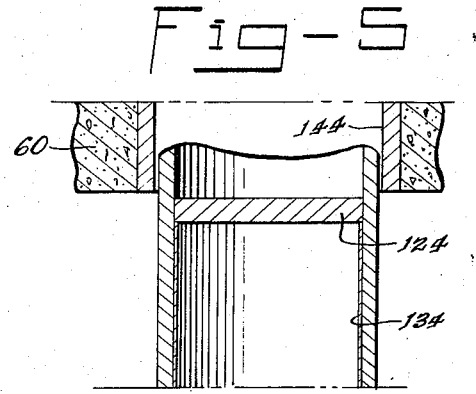
Fig. 5 is a vertical cross sectional view of the safety device as situated in the reactor.
Figure 6:
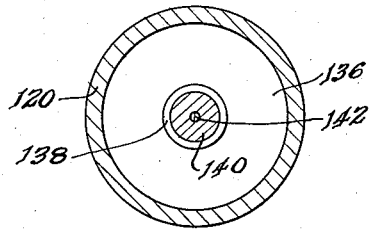
Fig. 6 is a horizontal sectional view taken on the line 6—6 in Fig. 5 and looking in the direction of the arrows.

Reference is now made to Figs. 4 to 6 of the drawing wherein is disclosed a specific safety device as applied to the reactor previously described.

The safety device 119 comprises an elongated tube 120 which is formed of one-tenth inch thick stainless steel and has an internal diameter of 1.18 inches. The overall length of the tube 120 is twelve feet four inches. Plates 122 and 124, respectively, close off the tube at distances of 16 inches and 60¼ inches from the bottom of the tube. Midway between the plates 122 and 124 there is a barrier across the tube 120 constituting a nuclear fuse 126. The bottom of the tube is provided with a tip 128. That portion of the tube 120 between plate 122 and nuclear fuse 126 constitutes an expansion chamber 130, and that portion of the tube 120 between plate 124 and nuclear fuse 126 constitutes a gas storage chamber 132. Gas storage chamber is lined with a one-half millimeter layer of cadmium 134. A gas having a high absorption cross section for neutrons is introduced into gas storage chamber 132 through a valve (not shown) in plate 124. The specific gas employed in the described embodiment of the invention is helium-3 having a cross section for thermal neutrons of 5000 barns. For ease of handling the tube 120 may be divided into sections which are screwed together immediately above plate 124.

Nuclear fuse 126 comprises a stainless steel ring 136 surrounding a copper disk 138. A cylindrical body 140 of enriched uranium is attached to the bottom of copper disk 138 by means of screw 142. The steel ring 136 is .19 inch in thickness and the copper disk is .16 inch in thickness. The diameter of the copper disk is .19 inch. Uranium body 140 contains 90% $U^{235}$ and is .19 inch thick and .16 inch in diameter weighing 1.14 grams.

The stainless steel employed to form the tube 120 and the ring 136 is type 410 with composition defined on p. 554 of the Metals Handbook for 1948. The tube must be located in such a position within the reactor that it does not interfere with introduction and removal of the fuel elements 24 through channels 64 and 66, or with operation of the control arms 84. It is accordingly located within the triangle formed by the central fuel element and two adjacent fuel elements but is off centered with respect to the center thereof. The center of the tube 120 is located 3.262 inches from the center of two fuel elements 24 and is therefore located 1.30 inches from the center of the control arm 84 which swings down past these two fuel elements. Location of the tube 120 is determined by the location of the channel 144 within the shield assemblies 60 and 62. Accordingly the channel 144 is located in the shield assemblies 60 and 62 between a plane tangent to the sides of a single row of channels 60 and 62 and a plane containing the axes of the channels 60 and 62 in said row.

An aperture 146 is provided in mounting plate 42 aligned with the channel 144.

The safety device is constructed as above described and the gas chamber 132 is filled with helium-3. It is then inserted into the reactor through channel 144 in upper and lower shield assemblies 60 and 62. For the safety device to have the maximum effect on reactivity of the reactor, it should be located in the reactor as near as possible to the central fuel element 24. It is therefore located adjacent the central fuel element 24 in the location shown in Figs. 2 and 4.

In this position the top of the tube 120 extends to a point just above the top of top shield 60, the gas expansion chamber 130 is located adjacent the fuel region of the fuel elements 24, and the gas storage chamber 132 is located just above the fuel region. The fuse 136 is located three inches below the top of the fuel region.

Helium-3 under a pressure of 114 atmospheres is stored in gas storage chamber 132. Cadmium layer 134 surrounding the He-3 prevents deterioration of the gas by neutron absorption. Since most of the gas storage chamber 132 is above the fuel area, the position of the gas therein is one of low statistical weight within the reactor. That is, the effect of the gas is comparatively slight on the reactivity of the reactor.

The nuclear fuse 126 is designed to destroy itself when the neutron flux reaches $10^{13}$ neutrons/cm.$^2$/sec. at the location of the fuse. The manner of its operation is of course obvious. The neutron flux within the reactor causes $U^{235}$ atoms within the cylindrical body 140 of $U^{235}$ to undergo fissions. The heat therefrom is transmitted to the copper disk 138 which melts when the heat transferred to it is greater than it can conduct to the steel ring 136. The helium-3 then expands into the expansion chamber 130 which being located adjacent the fuel region of the reactor is located in a position of high statistical weight where it has considerable effect on the reactivity of the reactor.

For the reactor described a single safety device as described will have a net effect of 3% on reactivity of the reactor. Obviously, additional safety devices may be incorporated into the reactor to obtain additional control.

It will be understood that introduction of the safety device into the described reactor will reduce the reactivity thereof. This reduction in reactivity may be compensated for by adjustment of the control arms 84b.

In addition to heat, a sharp object may be used to penetrate the barrier. This may be operated by melting of a release for a spring which upon release drives a sharp object against a barrier membrane.

Expansion chamber 130 may be almost completely filled with a moderating material such as beryllium or graphite to prevent the space from being completely wasted during normal operation of the reactor. Expansion of the gas into expansion chamber 130 will then be into the interstices in the moderating material where its effect will be proportionate to the amount of gas actually within the position of high statistical weight within the reactor.

It is obvious that all the criteria set forth in the introduction are satisfied by the described safety device. The safety device is inherently reliable as its firing depends only on nuclear effects within a body of $U^{235}$. No eventuality can prevent the fuse from firing when the neutron flux reaches the predetermined danger point. Also the device will remain quiescent until this danger point is reached. Any shock from bomb or earthquake which would trigger the fuse would be so severe as to make it desirable to shut down the reactor. The safety device requires no mechanical or electrical circuitry which could go out of order or be sabotaged. Sabotage would be virtually impossible since the safety device would have to be removed completely from the reactor to do anything to it which would interfere with its action. Since the gas is retained in the tube, it is a relatively simple matter to remove the tube and replace it with another one. Obviously firing of the device does no damage of any kind to the reactor.

The safety device may be adapted for use in virtually any reactor. All that is necessary is that a channel be built into the reactor for the insertion of the tube and the tube be designed so that the gas be held at a position of low statistical weight and take a position of high statistical weight upon firing of the fuse. Construction of the fuse will depend on its exact location within the reactor and the flux which is designed to trigger it.

It will be understood that this invention is not to be limited to the details given herein but that it may be modified within the scope of the appended claims.

What is claimed is:

1. A safety device for a nuclear reactor comprising a tube containing a first chamber and a second chamber, said first chamber containing a moderator, said second chamber containing at high pressure a gas having a high neutron absorption cross section, a barrier separating said first and second chambers, said barrier comprising an annulus of stainless steel surrounding a copper disk, and a mass of material fissionable by neutrons of thermal energy in thermal contact with said copper disk whereby the heat released from the fissionable material melts the copper disk when the neutron flux within the reactor reaches a predetermined danger point.

2. In a nuclear reactor comprising a core containing material fissionable by neutrons of thermal energy, a safety device comprising a tube containing a first chamber and a second chamber, said first chamber being located at a position of high statistical weight in the reactor and containing a moderator, said second chamber being located at a position of low statistical weight in the reactor, said second chamber containing at high pressure a gas having a high neutron absorption cross section, a barrier separating said first and second chambers, said barrier comprising an annulus of stainless steel surrounding a copper disk, and a mass of material fissionable by neutrons of thermal energy in thermal contact with said copper disk whereby the heat released from the fissionable material melts the copper disk when the neutron flux within the reactor reaches a predetermined danger point.

References Cited in the file of this patent

FOREIGN PATENTS 114,151    Australia _____ May 3, 1940

OTHER REFERENCES

"Proceedings of the International Conference on the Peaceful Uses of Atomic Energy," August 8–20, 1955, United Nations, New York, vol. 13, page 125.